(12) United States Patent
Ha

(10) Patent No.: US 11,838,669 B2
(45) Date of Patent: Dec. 5, 2023

(54) IMAGE SENSING DEVICE

(71) Applicant: SK hynix Inc., Icheon-si (KR)

(72) Inventor: Dong Ho Ha, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/502,345

(22) Filed: Oct. 15, 2021

(65) Prior Publication Data

US 2022/0264049 A1  Aug. 18, 2022

(30) Foreign Application Priority Data

Feb. 18, 2021 (KR) ........................ 10-2021-0021623

(51) Int. Cl.
*H04N 25/771* (2023.01)
(52) U.S. Cl.
CPC ................................ *H04N 25/771* (2023.01)
(58) Field of Classification Search
CPC .... H04N 25/771; H04N 25/778; H04N 25/70; H04N 25/75; H04N 25/59; H04N 25/7013; H04N 25/745
USPC ........................................................ 348/308
See application file for complete search history.

(56) References Cited

U.S. PATENT DOCUMENTS

| 2017/0099449 A1* | 4/2017 | Kang | ..................... H04N 25/75 |
| 2021/0151485 A1* | 5/2021 | Ma | ........................ H04N 25/771 |
| 2021/0400221 A1* | 12/2021 | Lee | ........................ H04N 25/11 |

FOREIGN PATENT DOCUMENTS

| KR | 20120107755 A | 10/2012 |
| KR | 20190120409 A | 10/2019 |

* cited by examiner

*Primary Examiner* — Lin Ye
*Assistant Examiner* — Chan T Nguyen
(74) *Attorney, Agent, or Firm* — Perkins Coie LLP

(57) ABSTRACT

An image sensing device includes a pixel array configured to include a plurality of pixel groups consecutively arranged in row and column directions. Each of the pixel groups includes a plurality of unit pixels and each unit pixel includes a photoelectric conversion element structured to generate photocharges through a conversion of incident light. Each pixel group outputs a first pixel signal corresponding to photocharges generated by a single unit pixel and a second pixel signal corresponding to a sum of photocharges generated by two or more unit pixels.

18 Claims, 7 Drawing Sheets

IMAGE SENSING DEVICE

CROSS-REFERENCE TO RELATED APPLICATION

This patent document claims the priority and benefits of Korean patent application No. 10-2021-0021623, filed on Feb. 18, 2021, the disclosure of which is incorporated by reference in its entirety as part of the disclosure of this patent document.

TECHNICAL FIELD

The technology and implementations disclosed in this patent document generally relate to an image sensing device.

BACKGROUND

An image sensing device is used in electronic devices to convert optical images into electrical signals. With the recent development of automotive, medical, computer and communication industries, the demand for highly integrated, higher-performance image sensors has been rapidly increasing in various electronic devices such as digital cameras, camcorders, personal communication systems (PCSs), video game consoles, surveillance cameras, medical micro-cameras, robots, etc.

SUMMARY

Various embodiments of the disclosed technology relate to an image sensing device capable of acquiring all pixel signals (e.g., a single pixel signal and a SUM pixel signal) of several modes using only one exposure.

In accordance with an embodiment of the disclosed technology, an image sensing device is provided to include a pixel array configured to include a plurality of pixel groups consecutively arranged in row and column directions. Each of the pixel groups may include a plurality of unit pixels and each unit pixel may include a photoelectric conversion element structured to generate photocharges through a conversion of incident light. Each of the pixel groups may output a first pixel signal corresponding to photocharges generated by a single unit pixel and a second pixel signal corresponding to a sum of photocharges generated by two or more unit pixels.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

This patent document provides implementations and examples of an image sensing device and the disclosed features may be implemented to achieve one or more advantages in more applications. Some implementations of the disclosed technology suggest designs of an image sensing device which can acquire all pixel signals (e.g., a single pixel signal and a SUM pixel signal) of several modes using only one exposure.

Reference will now be made in detail to certain embodiments, examples of which are illustrated in the accompanying drawings. Wherever possible, the same reference numbers will be used throughout the drawings to refer to the same or similar parts. In the following description, a detailed description of related known configurations or functions incorporated herein will be omitted to avoid obscuring the subject matter.

Figure 1:
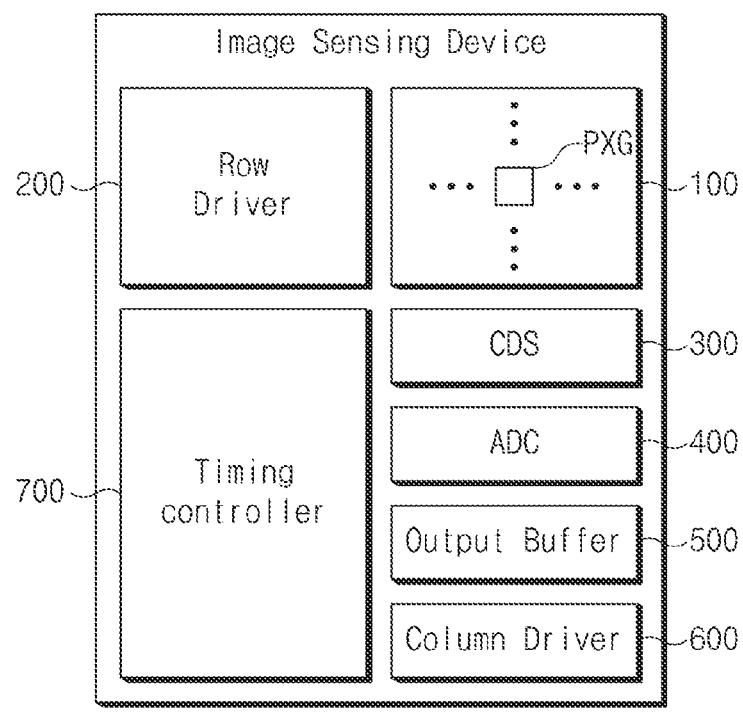
FIG. 1 is a block diagram illustrating an example of an image sensing device based on some implementations of the disclosed technology.

FIG. 1 is a block diagram illustrating an image sensing device according to an embodiment of the disclosed technology.

Referring to FIG. 1, the image sensing device may include a pixel array 100, a row driver 200, a correlated double sampler (CDS) 300, an analog-digital converter (ADC) 400, an output buffer 500, a column driver 600 and a timing controller 700. The components of the image sensing device illustrated in FIG. 1 are discussed by way of example only, and this patent document encompasses numerous other changes, substitutions, variations, alterations, and modifications.

The pixel array 100 may include a plurality of pixel groups (PXG) arranged in rows and columns. In one example, the plurality of pixel groups (PXG) may be arranged in a two-dimensional (2D) pixel array including rows and columns. In another example, the plurality of pixel groups (PXGs) may be arranged in a three-dimensional (3D) pixel array.

Each of the pixel groups (PXG) may include a plurality of unit pixels to generate photocharges by converting an optical signal into an electrical signal, and pixel transistors to output pixel signals corresponding to the photocharges generated by the unit pixels. The unit pixels included in the same pixel group (PXG) may receive light of the same color. For example, unit pixels included in the same pixel group (PXG) may include color filters disposed over a substrate, each of which allows light having a same color to pass therethrough and transmits the light to corresponding photoelectric conversion elements. The pixel transistors of each pixel group (PXG) may output a pixel signal (i.e., a single pixel signal) corresponding to photocharges generated by only one unit pixel included in the corresponding pixel group (PXG), or may output pixel signal (i.e., a 2-SUM pixel signal or a 4-SUM pixel signal) corresponding to photocharges generated by the plurality of unit pixels included in the corresponding pixel group (PXG). In this case, the 2-SUM pixel signal may refer to a pixel signal corresponding to the sum of photocharges generated by two unit pixels, and the 4-SUM pixel signal may refer to a pixel signal corresponding to the sum of photocharges generated by four unit pixels.

The pixel array 100 may receive driving signals (for example, a row selection signal, a pixel reset signal, a transmission (or transfer) signal, and a pass signal) from the row driver 200. Upon receiving the driving signal, the unit pixels and the pixel transistors in the pixel array 100 may be activated to perform the operations corresponding to the transfer signal, the pass signal, the row selection signal, and the pixel reset signal.

The row driver 200 may activate the pixel array 100 to perform certain operations on the unit pixels in the corresponding row based on control signals provided by controller circuitry such as the timing controller 700. In some implementations, the row driver 200 may select one or more pixel groups arranged in one or more rows of the pixel array 100. The row driver 200 may generate a row selection signal to select one or more rows from among the plurality of rows. The row driver 200 may sequentially enable the pixel reset signal, the transfer signal, and the pass signal for the pixel groups arranged in the selected row. The pixel signals (i.e., a single pixel signal, a 2-SUM pixel signal, and a 4-SUM pixel signal) generated by the pixel groups arranged in the selected row may be output to the correlated double sampler (CDS) 300.

The correlated double sampler (CDS) 300 may remove undesired offset values of the unit pixels using correlated double sampling. In one example, the correlated double sampler (CDS) 300 may remove the undesired offset values of the unit pixels by comparing output voltages of pixel signals obtained before and after photocharges generated by incident light are accumulated in the sensing node (i.e., a floating diffusion node). As a result, the CDS 300 may obtain a pixel signal generated only by the incident light without causing noise. In some implementations, upon receiving a clock signal from the timing controller 700, the CDS 300 may sequentially sample and hold voltage levels of the reference signal and the pixel signal, which are provided to each of a plurality of column lines from the pixel array 100. That is, the CDS 300 may sample and hold the voltage levels of the reference signal and the pixel signal which correspond to each of the columns of the pixel array 100. In some implementations, the CDS 300 may transfer the reference signal and the pixel signal of each of the columns as a correlate double sampling (CDS) signal to the ADC 400 based on control signals from the timing controller 700.

The ADC 400 is used to convert analog CDS signals received from the CDS 300 into digital signals. In some implementations, the ADC 400 may be implemented as a ramp-compare type ADC. The analog-to-digital converter (ADC) 400 may compare a ramp signal received from the timing controller 700 with the CDS signal received from the CDS 300, and may thus output a comparison signal indicating the result of comparison between the ramp signal and the CDS signal. The analog-to-digital converter (ADC) 400 may count a level transition time of the comparison signal in response to the ramp signal received from the timing controller 700, and may output a count value indicating the counted level transition time to the output buffer 500.

The output buffer 500 may temporarily store column-based image data provided from the ADC 400 based on control signals of the timing controller 170. The image data received from the ADC 400 may be temporarily stored in the output buffer 500 based on control signals of the timing controller 700. The output buffer 500 may provide an interface to compensate for data rate differences or transmission rate differences between the image sensing device and other devices.

The column driver 600 may select a column of the output buffer 500 upon receiving a control signal from the timing controller 700, and sequentially output the image data, which are temporarily stored in the selected column of the output buffer 500. In some implementations, upon receiving an address signal from the timing controller 700, the column driver 600 may generate a column selection signal based on the address signal, may select a column of the output buffer 500 using the column selection signal, and may control the image data received from the selected column of the output buffer 500 to be output as an output signal.

The timing controller 700 may generate signals for controlling operations of the row driver 200, the ADC 400, the output buffer 500 and the column driver 600. The timing controller 700 may provide the row driver 200, the column driver 600, the ADC 400, and the output buffer 500 with a clock signal required for the operations of the respective components of the image sensing device, a control signal for timing control, and address signals for selecting a row or column. In some implementations, the timing controller 700 may include a logic control circuit, a phase lock loop (PLL) circuit, a timing control circuit, a communication interface circuit and others.

Figure 2:
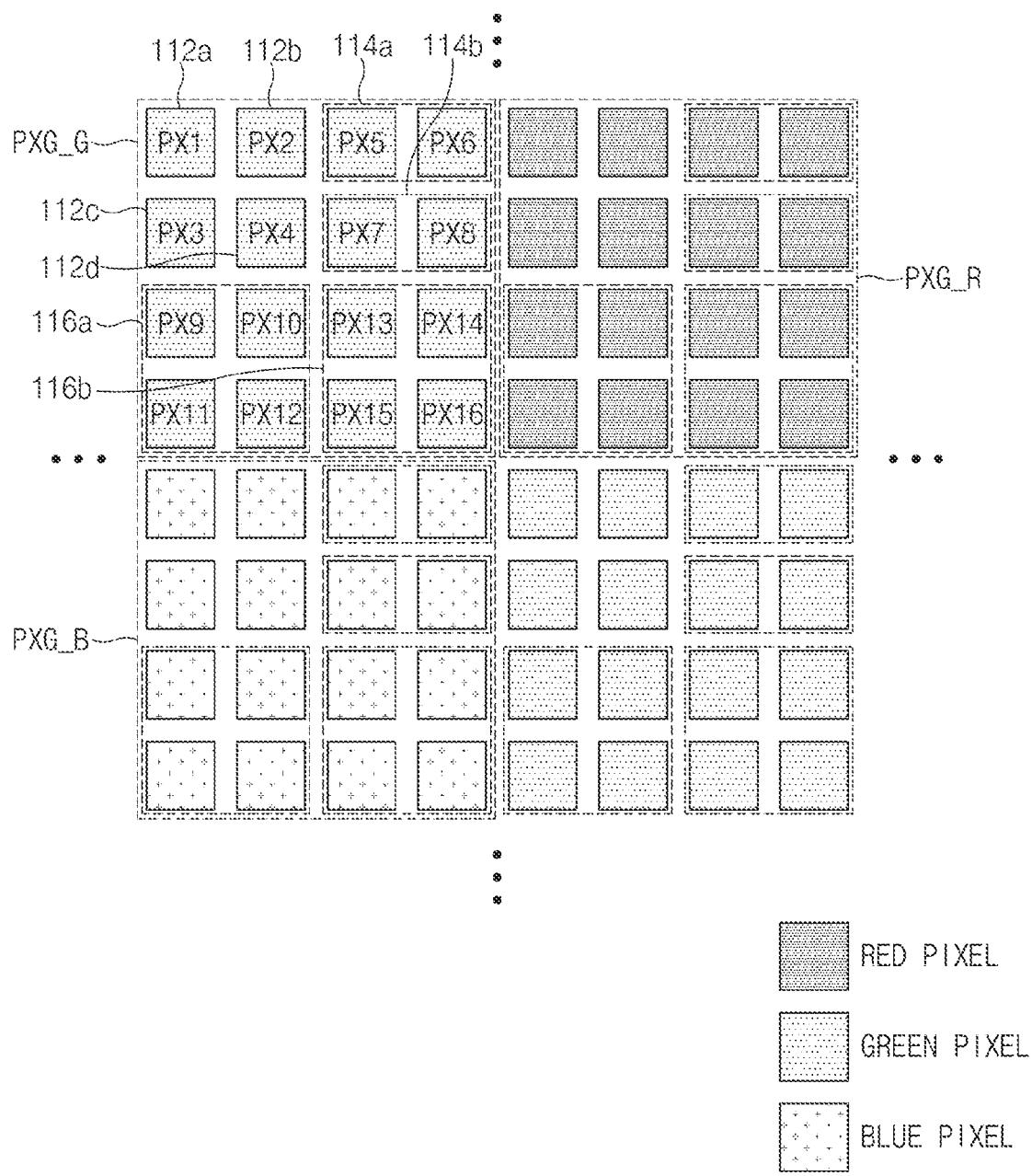
FIG. 2 is a schematic diagram illustrating an example of a layout structure of pixel groups included in a pixel array shown in FIG. 1 based on some implementations of the disclosed technology.

FIG. 2 is a schematic diagram illustrating an example of a layout structure of pixel groups included in the pixel array 100 shown in FIG. 1 based on some implementations of the disclosed technology.

Referring to FIG. 2, the pixel array 100 may include a plurality of pixel groups PXG_R, PXG_G, and PXG_B that are consecutively arranged in row and column directions. Each of the pixel groups PXG_R, PXG_G, and PXG_B may include a plurality of unit pixels PX1 to PX16 configured to receive light of the same color. For example, the pixel group PXG_R may include a plurality of unit pixels that receives red visible light and generates photocharges corresponding to the red visible light, the pixel group PXG_G may include a plurality of unit pixels that receives green visible light and generates photocharges corresponding to the green visible light, and the pixel group PXG_B may include a plurality of unit pixels that receives blue visible light and generates photocharges corresponding to the blue visible light. Each of the pixel groups PXG_R, PXG_G, and PXG_B may include 16 unit pixels PX1 to PX16 arranged adjacent to each other in a (4×4) matrix array. The pixel groups PXG_R, PXG_G, and PXG_B may be consecutively arranged in a Bayer pattern in the pixel array 100.

Each of the pixel groups PXG_R, PXG_G, and PXG_B may output different types of pixel signals depending on how many unit pixels are used to generate photocharges corresponding to each of the pixel signals. The different types of the pixel signals include a first pixel signal corresponding to photocharges generated by a single unit pixel and a second pixel signal corresponding to photocharges generated by multiple unit pixels (e.g., the sum of the photocharges generated by unit pixels). For example, the pixel group PXG_G may output a single pixel signal corresponding to photocharges generated by each of the unit pixels PX1, PX2, PX3, and PX4, a 2-SUM pixel signal corresponding to photocharges generated by two unit pixels PX5~PX6 or PX7~PX8, and may output a 4-SUM pixel signal corresponding to photocharges generated by four unit pixels PX9~PX12 or PX13~PX16.

In the descriptions with regard to FIG. 2, each unit pixel for outputting the single pixel signal will be referred to as a single pixel 112a, 112b, 112c, or 112d, a group of two unit pixels for outputting the 2-SUM pixel signal will be referred to as a 2-SUM pixel block 114a or 114b, and a group of four unit pixels for outputting the 4-SUM pixel signal will be referred to as a 4-SUM pixel block 116a or 116b.

Figure 3:
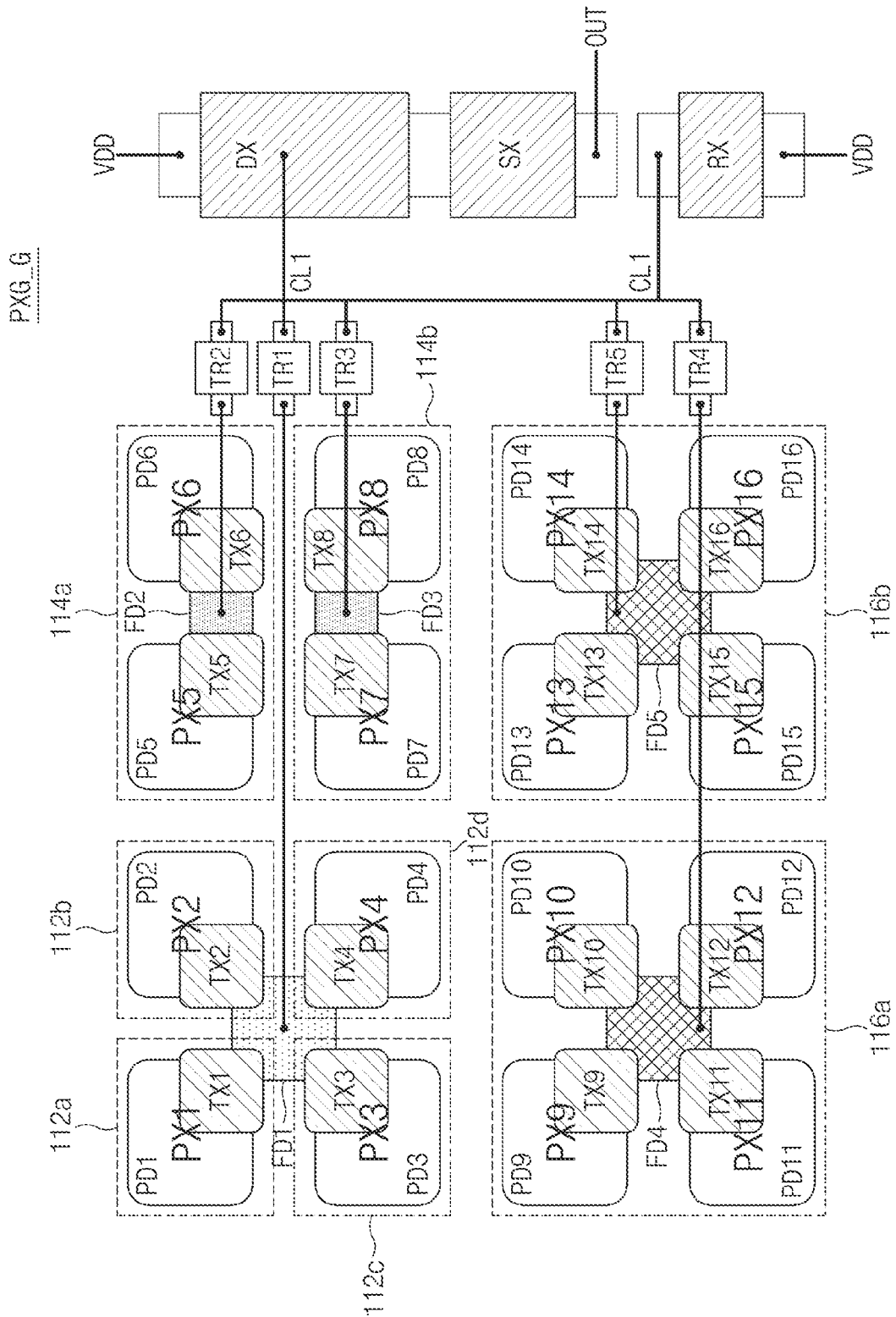
FIG. 3 is a schematic diagram illustrating an example of a planar structure of any one pixel group shown in FIG. 2 based on some implementations of the disclosed technology.
Figure 4:
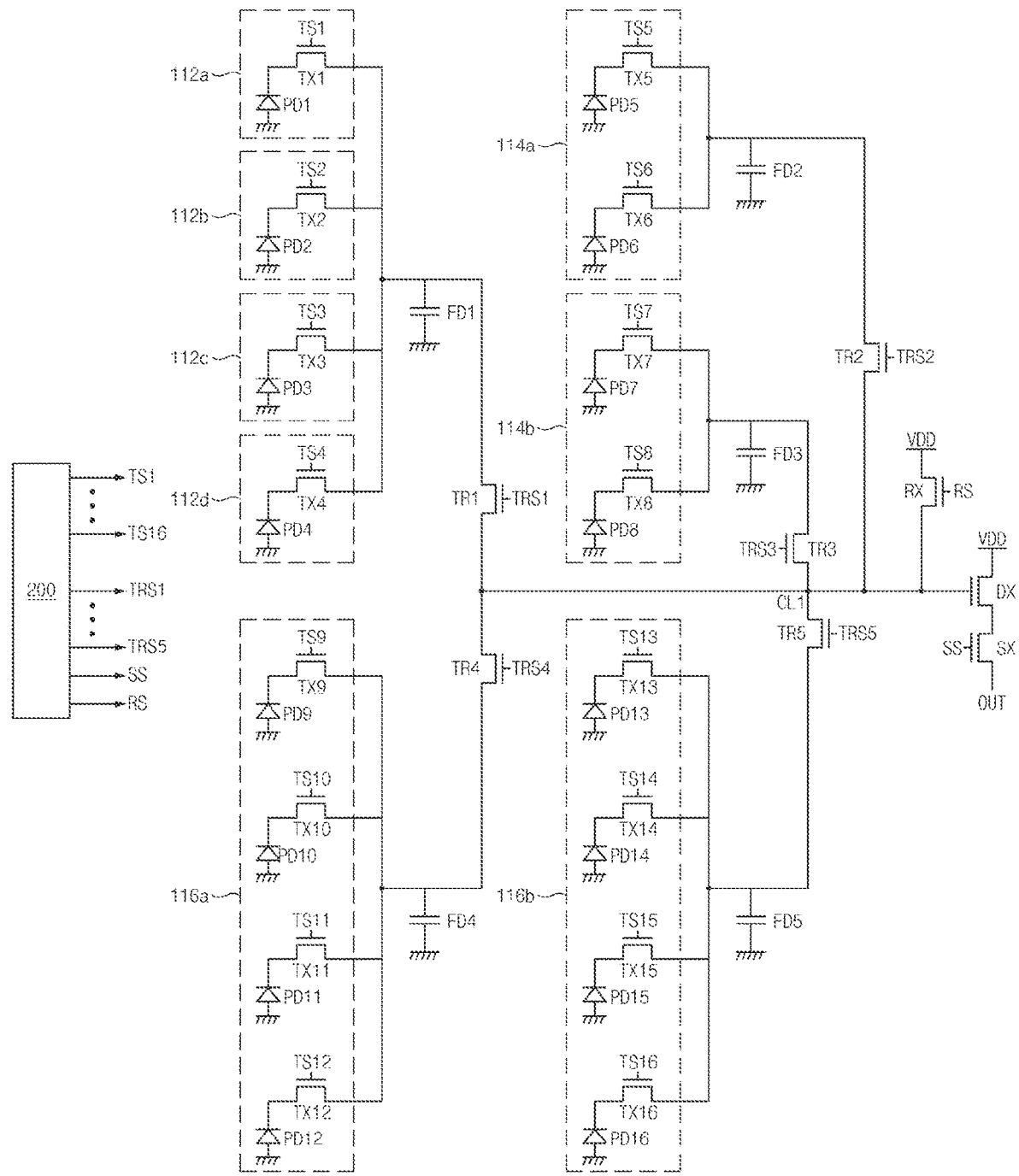
FIG. 4 is a circuit diagram illustrating an example of a circuit structure corresponding to the pixel group shown in FIG. 3 based on some implementations of the disclosed technology.

FIG. 3 is a schematic diagram illustrating an example of a planar structure of a pixel group shown in FIG. 2 based on some implementations of the disclosed technology. FIG. 4 is a circuit diagram illustrating an example of a circuit structure corresponding to the pixel group shown in FIG. 3 based on some implementations of the disclosed technology. Although FIGS. 3 and 4 show the structures of the pixel group PXG-G, the structures can be applied to any pixel group PXG_R or PXG_B_shown in FIG. 2.

Referring to FIGS. 3 and 4, the pixel group PXG_G may include a plurality of unit pixels PX1 to PX16 consecutively arranged in row and column directions. For example, the pixel group PXG_G may include 16 unit pixels PX1 to PX16 arranged adjacent to each other in a (4×4) matrix array. Although the above-mentioned implementation has exemplarily disclosed only the pixel group PXG_G corresponding to green color, the pixel groups PXG_R, PXG_G, and PXG_B can also be formed to have the same structure.

In some implementations, the pixel group PXG_G may include unit pixels PX1 to PX16, floating diffusion regions FD1 to FD5, pass transistors TR1 to TR5, and pixel transistors DX, SX, and RX.

The unit pixels PX1 to PX16 may respectively include photoelectric conversion element PD1 to PD16 for generating photocharges in response to incident light, and may respectively include transfer transistors TX1 to TX16 for transmitting the photocharges generated by the corresponding photoelectric conversion elements PD1 to PD16 to the floating diffusion regions FD1 to FD5 in response to the transfer signals TS1 to TS16. In more detail, the unit pixel PX1 may include the photoelectric conversion element PD1 and the transfer transistor TX1, the unit pixel PX2 may include the photoelectric conversion element PD2 and the transfer transistor TX2, the unit pixel PX3 may include the photoelectric conversion element PD3 and the transfer transistor TX3, and the unit pixel PX4 may include the photoelectric conversion element PD4 and the transfer transistor TX4. The unit pixel PX5 may include the photoelectric conversion element PD5 and the transfer transistor TX5, the unit pixel PX6 may include the photoelectric conversion element PD6 and the transfer transistor TX6, the unit pixel PX7 may include the photoelectric conversion element PD7 and the transfer transistor TX7, and the unit pixel PX8 may include the photoelectric conversion element PD8 and the transfer transistor TX8. The unit pixel PX9 may include the photoelectric conversion element PD9 and the transfer transistor TX9, the unit pixel PX10 may include the photoelectric conversion element PD10 and the transfer transistor TX10, the unit pixel PX11 may include the photoelectric conversion element PD11 and the transfer transistor TX11, and the unit pixel PX12 may include the photoelectric conversion element PD12 and the transfer transistor TX12. The unit pixel PX13 may include the photoelectric conversion element PD13 and the transfer transistor TX13, the unit pixel PX14 may include the photoelectric conversion element PD14 and the transfer transistor TX14, the unit pixel PX15 may include the photoelectric conversion element PD15 and the transfer transistor TX15, and the unit pixel PX16 may include the photoelectric conversion element PD16 and the transfer transistor TX16. The unit pixels PX1 to PX16 may be classified into a group of single pixels 112a to 112d, 2-SUM pixel blocks 114a and 114b, and 4-SUM pixel blocks 116a and 116b.

In some implementations, each of the photoelectric conversion elements PD1 to PD16 may produce an electrical signal in response to received light and include, e.g., a photodiode, a photo transistor, a photo gate, or other photosensitive circuitry capable of converting light into a pixel signal (e.g., a charge, a voltage or a current). When the photoelectric conversion elements are implemented to include photodiodes, the photoelectric conversion elements PD1 to PD16 may be formed in a substrate. Each of the photoelectric conversion elements PD1 to PD16 may include a stacked structure in which impurity regions (i.e., P-type and N-type impurity regions) having complementary conductivities are vertically stacked.

The transfer transistors TX1 to TX16 may be coupled to the photoelectric conversion elements PD1 to PD16, respectively, and may be coupled to the corresponding floating diffusion regions FD1 to FD5. As a result, the transfer transistors TX1 to TX16 may transmit photocharges generated by the corresponding photoelectric conversion elements PD1 to PD16 to the corresponding floating diffusion regions FD1 to FD5 in response to the transfer signals TS1 to TS16.

For example, the transfer transistors TX1, TX2, TX3, and TX4 respectively belonging to the single pixels 112a, 112b, 112d, and 112d may transmit photocharges generated by the corresponding photoelectric conversion elements PD1, PD2, PD3, and PD4 to the floating diffusion region FD1 in response to the transfer signals TS1, TS2, TS3, and TS4. The transfer transistors TX5 and TX6 included in the 2-SUM pixel block 114a may transmit photocharges generated by the corresponding photoelectric conversion elements PD5 and PD6 to the floating diffusion region FD2 in response to the transfer signals TS5 and TS6. In more detail, the transfer transistor TX5 of the 2-SUM pixel block 114a may transmit photocharges generated by the photoelectric conversion element PD5 to the floating diffusion region FD2 in response to the transfer signal TS5, and the other transfer transistor TX6 of the 2-SUM pixel block 114a may transmit photocharges generated by the photoelectric conversion element PD6 to the floating diffusion region FD2 in response to the transfer signal TS6. The transfer transistors TX7 and TX8 included in the 2-SUM pixel block 114b may transmit photocharges generated by the corresponding photoelectric conversion elements PD7 and PD8 to the floating diffusion region FD3 in response to the transfer signals TS7 and TS8. In more detail, the transfer transistor TX7 of the 2-SUM pixel block 114b may transmit photocharges generated by the photoelectric conversion element PD7 to the floating diffusion region FD3 in response to the transfer signal TS7, and the other transfer transistor TX8 of the 2-SUM pixel block 114b may transmit photocharges generated by the photoelectric conversion element PD8 to the floating diffusion region FD3 in response to the transfer signal TS8. The transfer transistors TX9 to TX12 included in the 4-SUM pixel block 116a may transmit photocharges generated by the corresponding photoelectric conversion elements PD9 to PD12 to the floating diffusion region FD4 in response to the transfer signals TS9 to TS12. The transfer transistors TX13 to TX16 included in the 4-SUM pixel block 116b may transmit photocharges generated by the corresponding photoelectric conversion elements PD13 to PD16 to the floating diffusion region FD5 in response to the transfer signals TS13 to TS16.

Each of the floating diffusion regions FD1 to FD5 may include an impurity region formed by implanting impurities (e.g., N-type impurities) into an upper portion of the substrate, and may store photocharges carried by the transfer transistors TX1 to TX16. In more detail, the floating diffusion region FD1 may store photocharges received from the transfer transistors TX1 to TX4, the floating diffusion region FD2 may store photocharges received from the transfer transistors TX5 and TX6, the floating diffusion region FD3 may store photocharges received from the transfer transistors TX7 and TX8, the floating diffusion region FD4 may store photocharges received from the transfer transistors TX9 to TX12, and the floating diffusion region FD5 may store photocharges received from the transfer transistors TX13 to TX16.

The floating diffusion region FD1 may be shared by the single pixels 112a to 112d, and may store photocharges received from any one of the transfer transistors TX1 to TX4. The transfer transistors TX1, TX2, TX3, and TX4 may be sequentially turned on in response to the transfer signals TS1, TS2, TS3, and TS4. The floating diffusion region FD1 may have a size (capacity) capable of storing photocharges generated by any one unit pixel.

The floating diffusion region FD2 may be shared by the unit pixels PX5 and PX6 included in the 2-SUM pixel block 114a, and may store the sum of photocharges received from the transfer transistors TX5 and TX6. The transfer transistors TX5 and TX6 may be sequentially turned on in response to the transfer signals TS5 and TS6, or may be simultaneously turned on in response to the transfer signals TS5 and TS6.

The floating diffusion region FD3 may be shared by the unit pixels PX7 and PX8 included in the 2-SUM pixel block 114b, and may store the sum of photocharges received from the transfer transistors TX7 and TX8. The transfer transistors TX7 and TX8 may be sequentially turned on in response to the transfer signals TS7 and TS8, or may be simultaneously turned on in response to the transfer signals TS7 and TS8.

Each of the floating diffusion region FD2 of the 2-SUM pixel block 114a and the floating diffusion region FD3 of the 2-SUM pixel block 114b may be two or more times larger in photocharge storage capacity than the floating diffusion region FD1 shared by the single pixels 112a to 112d. In more detail, each of the floating diffusion regions FD2 and FD3 may have a size (capacity) capable of storing all photocharges generated by at least two unit pixels.

The floating diffusion region FD4 may be shared by the unit pixels PX9 to PX12 included in the 4-SUM pixel block 116a, and may store the sum of photocharges received from the transfer transistors TX9 to TX12. The transfer transistors TX9 to TX12 may be sequentially turned on in response to the transfer signals TS9 to TS12, or may be simultaneously turned on in response to the transfer signals TS9 to TS12.

The floating diffusion region FD5 may be shared by the unit pixels PX13 to PX16 included in the 4-SUM pixel block 116b, and may store the sum of photocharges received from the transfer transistors TX13 to TX16. The transfer transistors TX13 to TX16 may be sequentially turned on in response to the transfer signals TS13 to TS16, or may be simultaneously turned on in response to the transfer signals TS13 to TS16.

Each of the floating diffusion region FD4 of the 4-SUM pixel block 116a and the floating diffusion region FD5 of the 4-SUM pixel block 116b may be two or more times larger in photocharge storage capacity than the floating diffusion region FD2 or FD3 of the 2-SUM pixel block 114a or 114b. In more detail, each of the floating diffusion regions FD4 and FD5 may have a size (capacity) capable of storing all photocharges generated by at least four unit pixels.

The floating diffusion region FD1, FD2, FD3, FD4 or FD5 may be coupled to one terminal (e.g., a source or drain) of the corresponding pass transistor TR1, TR2, TR3, TR4, or TR5 through a conductive line (e.g., a metal line). The other terminals (e.g., a drain or source) of the pass transistors TR1 to TR5 may be coupled to a common node CL1. The common node CL1 may be coupled to a gate of the source follower transistor DX and one terminal (e.g., a source or drain) of the reset transistor RX.

The pass transistors TR1 to TR5 may be turned on or off in response to the pass signals TRS1 to TRS5, respectively.

For example, in order to couple the floating diffusion region FD1 shared by the single pixels 112a to 112d to the gate of the source follower transistor DX, the pass signal TRS1 may be enabled (or activated) to a high level, such that the pass transistor TR1 can be turned on. Thus, the pass transistor TR1 may be turned on to output a single pixel signal corresponding to each of the single pixels 112a to 112d. When the pass transistor TR1 is turned on, other pass transistors TR2 to TR5 may be turned off.

In order to couple the floating diffusion region FD2 of the 2-SUM pixel block 114a to the gate of the source follower transistor DX, the pass signal TRS2 may be enabled (or activated) to a high level, such that the pass transistor TR2 can be turned on. Thus, the pass transistor TR2 may be turned on to output a 2-SUM pixel signal corresponding to the sum of photocharges of two unit pixels PX5 and PX6 included in the 2-SUM pixel block 114a. When the pass transistor TR2 is turned on, other pass transistors TR1, TR3, TR4, and TR5 may be turned off.

In order to couple the floating diffusion region FD3 of the 2-SUM pixel block 114b to the gate of the source follower transistor DX, the pass signal TRS3 may be enabled (or activated) to a high level, such that the pass transistor TR3 can be turned on. Thus, the pass transistor TR3 may be turned on to output a 2-SUM pixel signal corresponding to the sum of photocharges of two unit pixels PX7 and PX8 included in the 2-SUM pixel block 114b. When the pass transistor TR3 is turned on, other pass transistors TR1~TR2 and TR4~TR5 may be turned off.

In order to couple the floating diffusion region FD4 of the 4-SUM pixel block 116a to the gate of the source follower transistor DX, the pass signal TRS4 may be enabled (or activated) to a high level, such that the pass transistor TR4 can be turned on. Thus, the pass transistor TR4 may be turned on to output a 4-SUM pixel signal corresponding to the sum of photocharges of four unit pixels PX9 to PX12 included in the 4-SUM pixel block 116a. When the pass transistor TR4 is turned on, other pass transistors TR1~TR3 and TR5 may be turned off.

In order to couple the floating diffusion region FD5 of the 4-SUM pixel block 116b to the gate of the source follower transistor DX, the pass signal TRS5 may be enabled (or activated) to a high level, such that the pass transistor TR5 can be turned on. Thus, the pass transistor TR5 may be turned on to output a 4-SUM pixel signal corresponding to the sum of photocharges of four unit pixels PX13 to PX16 included in the 4-SUM pixel block 116b. When the pass transistor TR5 is turned on, other pass transistors TR1 to TR4 may be turned off.

One terminal (e.g., a source or drain) of the source follower transistor DX may be coupled to a pixel voltage (VDD) node, and the other terminal (e.g., a drain or source) of the source follower transistor DX may be coupled to one terminal (e.g., a source or drain) of the selection transistor SX. The other terminal (e.g., a drain or source) of the selection transistor SX may be coupled to the output node (OUT). Thus, the source follower transistor DX and the selection transistor SX may be coupled in series between the pixel voltage (VDD) node and the output node (OUT).

The source follower transistor DX may generate a pixel signal (e.g., a single pixel signal, a 2-SUM pixel signal, or a 4-SUM pixel signal) corresponding to the magnitude (amount) of photocharges transferred to the common node (CL1) by the pass transistors TR1 to TR5, and may output the generated pixel signal to the selection transistor SX. The selection transistor SX may transmit the pixel signal received from the source follower transistor DX to the output node (OUT) in response to the selection signal SS.

One terminal (e.g., a source or drain) of the reset transistor RX may be coupled to the common node (CL1), and the other terminal (e.g., a drain or source) of the reset transistor RX may be coupled to the pixel voltage (VDD) node. The reset transistor RX may initialize the common node CL1 to the pixel voltage (VDD) in response to the reset signal RS.

Active regions in which the pass transistors TR1~TR5 and the pixel transistors DX, SX, and RX are formed, active regions in which the transfer transistors TX1 to TX16 are formed, and active regions in which the floating diffusion regions FD1 to FD5 are formed may be isolated by a device isolation structure. In this case, the device isolation structure may include a trench-shaped device isolation structure formed by etching the substrate or a junction isolation structure formed by implanting impurities (e.g., P-type impurities) into the substrate.

The transfer signals TS1 to TS16, the pass signals TRS1 to TRS5, the selection signal SX, and the reset signal RS may be provided from the row driver 200.

Figure 5:
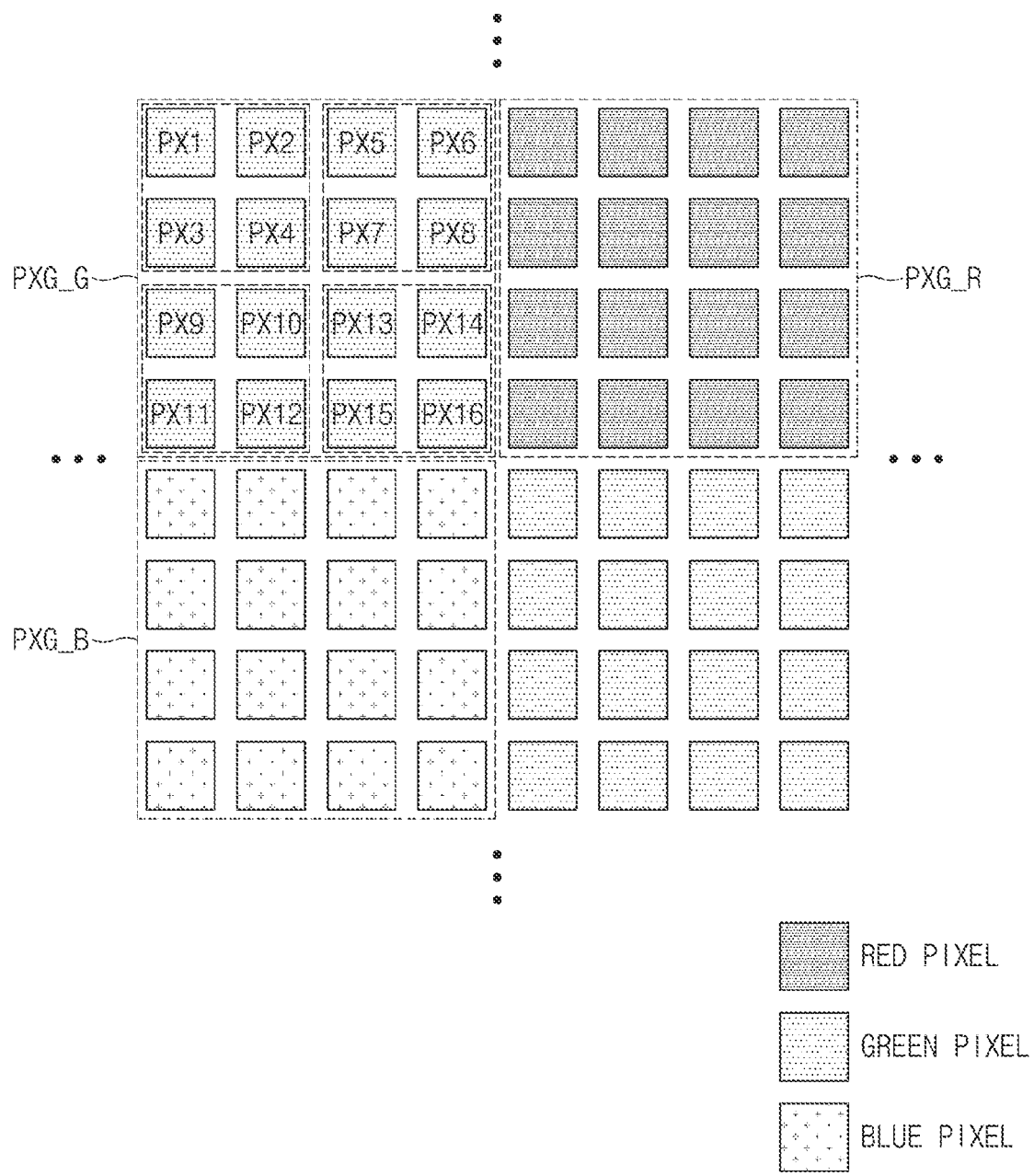
FIG. 5 is a schematic diagram illustrating another example of a layout structure of pixel groups included in a pixel array shown in FIG. 1 based on some implementations of the disclosed technology.

FIG. 5 is a schematic diagram illustrating another example of a layout structure of pixel groups included in a pixel array shown in FIG. 1 based on some implementations of the disclosed technology.

Referring to FIG. 5, the pixel array 100 may include a plurality of pixel groups PXG_R, PXG_G, and PXG_B consecutively arranged in row and column directions. Each of the pixel groups PXG_R, PXG_G, and PXG_B may include a plurality of unit pixels PX1 to PX16 configured to receive light of the same color. For example, the pixel group PXG_R may include a plurality of unit pixels that receives red visible light and generates photocharges corresponding to the red visible light, the pixel group PXG_G may include a plurality of unit pixels that receives green visible light and generates photocharges corresponding to the green visible light, and the pixel group PXG_B may include a plurality of unit pixels that receives blue visible light and generates photocharges corresponding to the blue visible light. Each of the pixel groups PXG_R, PXG_G, and PXG_B may include 16 unit pixels PX1 to PX16 arranged adjacent to each other in a (4×4) matrix array.

Unlike the implementation as shown in FIG. 2 in which the pixel group includes a single pixel outputting a single pixel signal, 2-SUM pixel block outputting the 2-SUM pixel signal, 4-SUM pixel block outputting the 4-SUM pixel signal, the plurality of unit pixels included in each pixel group PXG_R, PXG_G, or PXG_B in FIG. 5 may be arranged such that four unit pixels form a sub-pixel group and each pixel group PXG_R, PXG_G, or PXG_B includes four sub-pixel groups.

Each pixel group PXG_R, PXG_G, or PXG_B may output different types of pixel signals including a first pixel signal corresponding to photocharges generated by only one unit pixel (i.e., a single unit pixel) and a second pixel signal corresponding to photocharges generated by multiple pixel signals. In the example of FIG. 5, the second pixel signal can be any one of 2-SUM pixel signal corresponding to photocharges generated by two unit pixels to 7-SUM pixel signal corresponding to photocharges generated by seven unit pixels.

Figure 6:
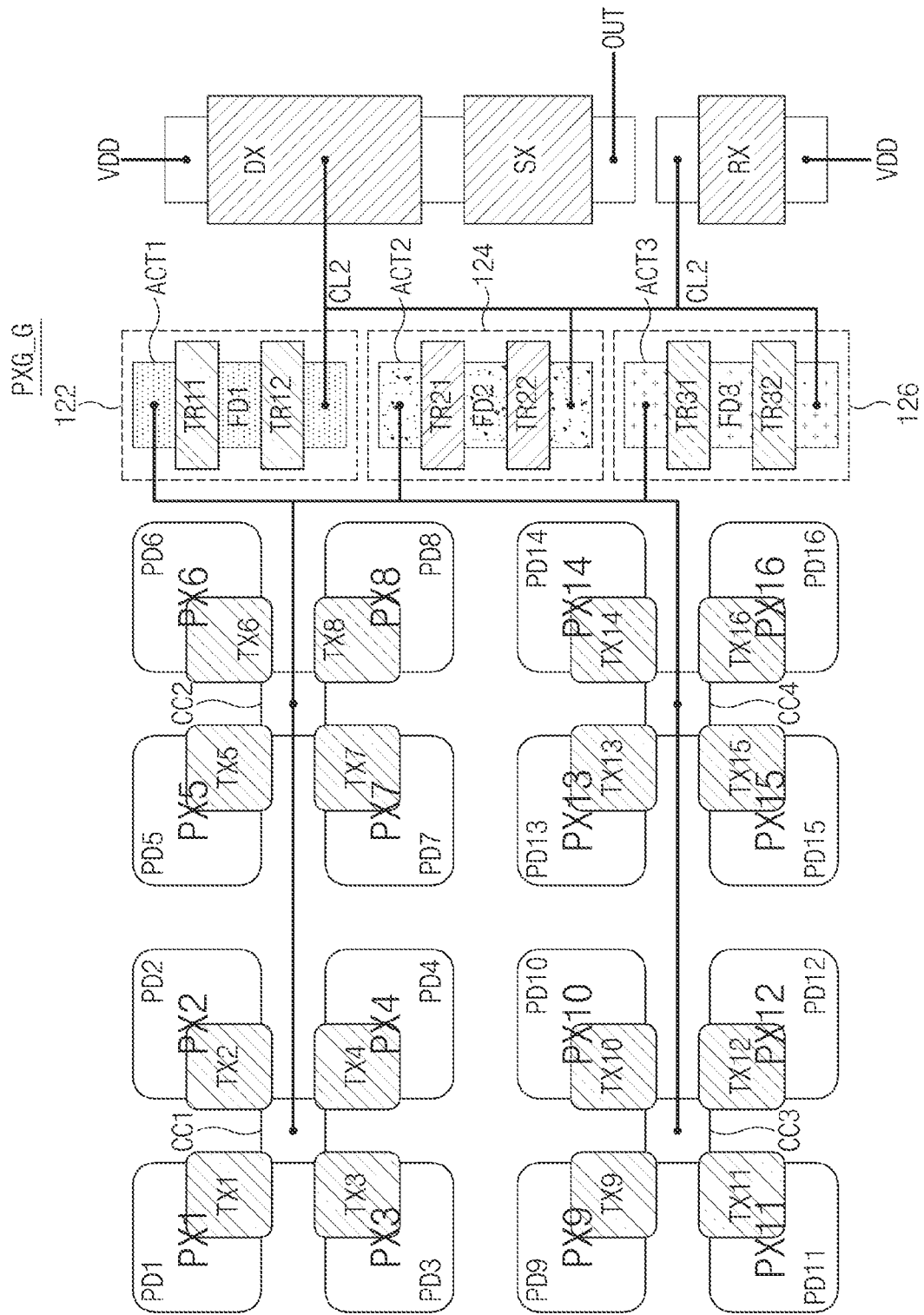
FIG. 6 is a schematic diagram illustrating an example of a planar structure of any one pixel group shown in FIG. 5 based on some implementations of the disclosed technology.
Figure 7:
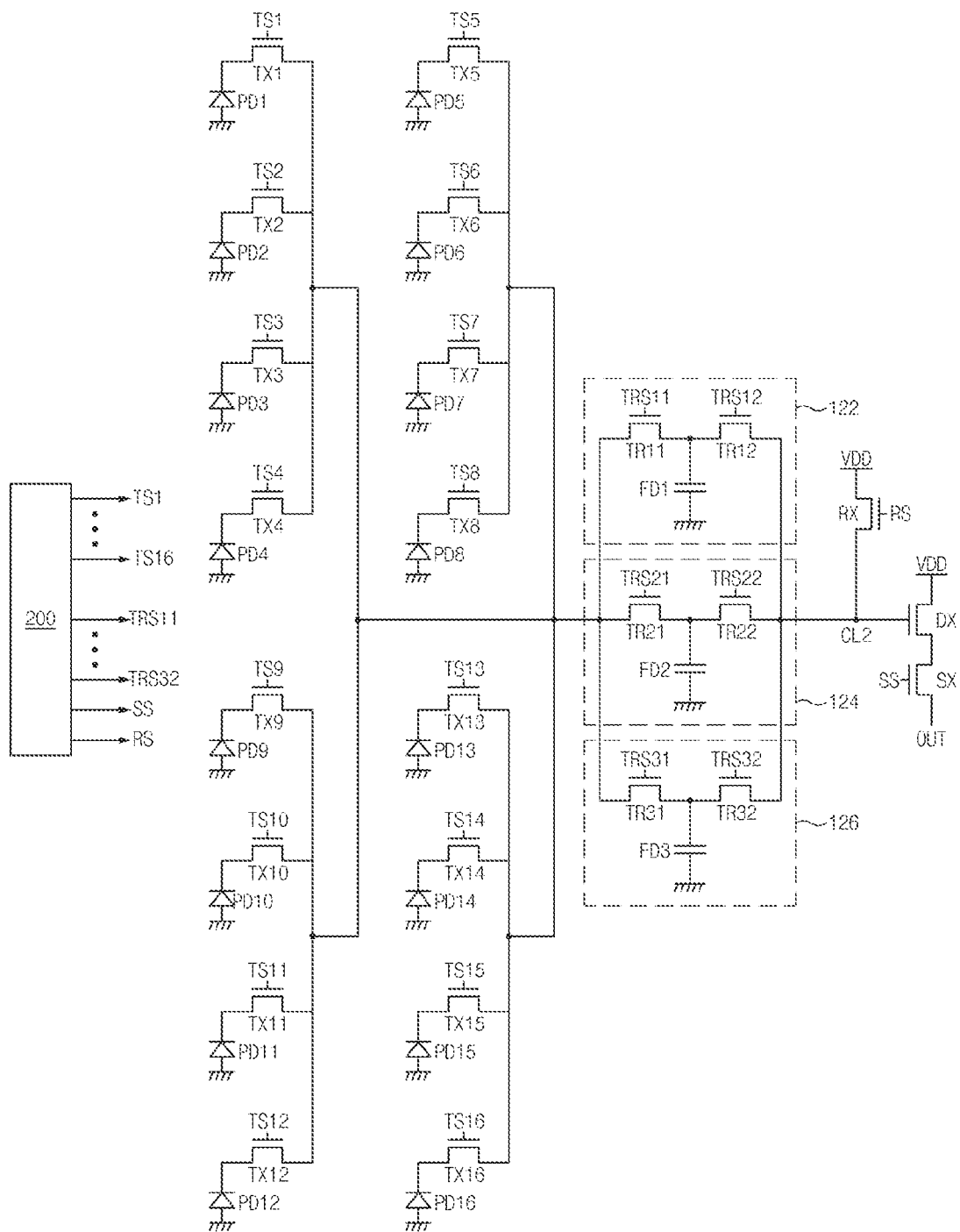
FIG. 7 is a circuit diagram illustrating an example of a circuit structure corresponding to the pixel group shown in FIG. 6 based on some implementations of the disclosed technology.

FIG. 6 is a schematic diagram illustrating an example of a planar structure of a pixel group shown in FIG. 5 based on some implementations of the disclosed technology. FIG. 7 is a circuit diagram illustrating an example of a circuit structure corresponding to the pixel group shown in FIG. 6 based on some implementations of the disclosed technology. Although FIGS. 6 and 7 show the structures of the pixel group PXG_G, the structures can be applied to any pixel group PXG_R or PXG_B shown in FIG. 5.

Referring to FIGS. 6 and 7, the pixel group PXG_G may include a plurality of unit pixels PX1 to PX16 consecutively arranged in row and column directions. For example, the pixel group PXG_G may include 16 unit pixels PX1 to PX16 arranged adjacent to each other in a (4×4) matrix array. Although the above-mentioned implementation has exemplarily disclosed only the pixel group PXG_G corresponding to green color, the pixel groups PXG_R, PXG_G, and PXG_B can also be formed to have the same structure.

In some implementations, the pixel group PXG_G may include unit pixels PX1 to PX16, common connectors CC1 to CC4, photocharge storage circuits 122, 124, and 126, and pixel transistors DX, SX, and RX.

The unit pixels PX1 to PX16 may respectively include photoelectric conversion element PD1 to PD16 for generating photocharges in response to incident light, and may respectively include transfer transistors TX1 to TX16 for transmitting the photocharges generated by the corresponding photoelectric conversion elements PD1 to PD16 to the common connectors CC1 to CC4 in response to the transfer signals TS1 to TS16. In more detail, the unit pixel PX1 may include the photoelectric conversion element PD1 and the transfer transistor TX1, the unit pixel PX2 may include the photoelectric conversion element PD2 and the transfer transistor TX2, the unit pixel PX3 may include the photoelectric conversion element PD3 and the transfer transistor TX3, and the unit pixel PX4 may include the photoelectric conversion element PD4 and the transfer transistor TX4. The unit pixel PX5 may include the photoelectric conversion element PD5 and the transfer transistor TX5, the unit pixel PX6 may include the photoelectric conversion element PD6 and the transfer transistor TX6, the unit pixel PX7 may include the photoelectric conversion element PD7 and the transfer transistor TX7, and the unit pixel PX8 may include the photoelectric conversion element PD8 and the transfer transistor TX8. The unit pixel PX9 may include the photoelectric conversion element PD9 and the transfer transistor TX9, the unit pixel PX10 may include the photoelectric conversion element PD10 and the transfer transistor TX10, the unit pixel PX11 may include the photoelectric conversion element PD11 and the transfer transistor TX11, and the unit pixel PX12 may include the photoelectric conversion element PD12 and the transfer transistor TX12. The unit pixel PX13 may include the photoelectric conversion element PD13 and the transfer transistor TX13, the unit pixel PX14 may include the photoelectric conversion element PD14 and the transfer transistor TX14, the unit pixel PX15 may include the photoelectric conversion element PD15 and the transfer transistor TX15, and the unit pixel PX16 may include the photoelectric conversion element PD16 and the transfer transistor TX16.

Each of the photoelectric conversion elements PD1 to PD16 may include a photodiode. For example, the photoelectric conversion elements PD1 to PD16 may be formed in the substrate. Each of the photoelectric conversion elements PD1 to PD16 may include a stacked structure in which impurity regions (i.e., P-type and N-type impurity regions) having complementary conductivities are vertically stacked.

The transfer transistors TX1 to TX16 may be coupled to the photoelectric conversion elements PD1 to PD16, respectively, and may be coupled to the corresponding common connectors CC1 to CC4. As a result, the transfer transistors TX1 to TX16 may transmit photocharges generated by the corresponding photoelectric conversion elements PD1 to PD16 to the corresponding common connectors CC1 to CC4 in response to the transfer signals TS1 to TS16.

For example, the transfer transistors TX1 to TX4 may transmit photocharges generated by the corresponding photoelectric conversion elements PD1 to PD4 to the common connector CC1 in response to the transfer signals TS1 to TS4. The transfer transistors TX5 to TX8 may transmit photocharges generated by the corresponding photoelectric conversion elements PD5 to PD8 to the common connector CC2 in response to the transfer signals TS5 to TS8. The transfer transistors TX9 to TX12 may transmit photocharges generated by the corresponding photoelectric conversion elements PD9 to PD12 to the common connector CC3 in response to the transfer signals TS9 to TS12. The transfer transistors TX13 to TX16 may transmit photocharges generated by the corresponding photoelectric conversion elements PD13 to PD16 to the common connector CC4 in response to the transfer signals TS13 to TS16.

The common connectors CC1 to CC4 may be commonly coupled to the plurality of unit pixels (e.g., four unit pixels). For example, the common connector CC1 may be commonly coupled to the four unit pixels PX1 to PX4, and the common connector CC2 may be commonly coupled to four unit pixels PX5 to PX8. In addition, the common connector CC3 may be commonly coupled to four unit pixels PX9 to PX12, and the common connector CC4 may be commonly coupled to four unit pixels PX13 to PX16. The common connectors CC1 to CC4 may be coupled to one terminal (e.g., a source or drain) of each of photocharge storage circuits 122, 124, and 126 through conductive lines. Thus, photocharges transferred to the common connectors CC1 to CC4 may be directly transmitted to the photocharge storage circuits 122, 124, and 126 through conductive lines.

Each of the common connectors CC1 to CC4 may include an impurity region formed by implanting impurities (e.g., N-type impurities) into an upper portion of the substrate. As compared to the floating diffusion regions FD1, FD4, and FD5 shown in FIG. 3, the common connectors CC1 to CC4 may be located at the same positions as the floating diffusion regions FD1, FD4, and FD5 shown in FIG. 3 but configured to perform different operations from the floating diffusion regions FD1, FD4, and FD5 shown in FIG. 3. The common connectors CC1 to CC4 may serve as interconnection regions through which the unit pixels PX1 to PX16 are coupled to the photocharge storage circuits 122, 124, and 126 through conductive lines. Therefore, each of the common connectors CC1 to CC4 may be formed to have a predetermined size capable of being electrically connected to the conductive lines, and may be smaller in size than each of the floating diffusion regions FD1, FD4, and FD5.

The photocharge storage circuits 122, 124, and 126 may store photocharges generated by the unit pixels PX1 to PX16 in the floating diffusion regions FD1 to FD3 in response to pass signals TRS11 to TRS32, and may output the photocharges stored in the floating diffusion regions FD1 to FD3 to a common node CL2. In this case, the floating diffusion regions FD1 to FD3 may be different in size (i.e., photocharge storage capacity) from each other.

For example, the photocharge storage circuit 122 may include pass transistors TR11 and TR12 coupled in series to each other in an active region ACT1, and a floating diffusion region FD1 located between gates of the pass transistors TR11 and TR12 in the active region ACT1. Thus, the floating diffusion region FD1 may include an impurity region (e.g., a source or drain) commonly coupled to the pass transistors TR11 and TR12. In this case, the floating diffusion region FD1 may be formed to have a size (capacity) capable of storing photocharges generated by a single unit pixel.

Since the pass transistor TR11 is turned on and the pass transistor TR12 is turned off, the photocharge storage circuit 122 may store photocharges in the floating diffusion region FD1. In addition, since the pass transistor TR11 is turned off and the pass transistor TR12 is turned on, the photocharge storage circuit 122 may output photocharges stored in the floating diffusion region FD1 to the common node CL2. The pass transistor TR11 may be turned on or off in response to the pass signal TRS11, and the pass transistor TR12 may be turned on or off in response to the pass signal TRS12.

The photocharge storage circuit 124 may include pass transistors TR21 and TR22 coupled in series to each other in an active region ACT2, and a floating diffusion region FD2 located between gates of the pass transistors TR21 and TR22 in the active region ACT2. Thus, the floating diffusion region FD2 may include an impurity region (e.g., a source or drain) commonly coupled to the pass transistors TR21 and TR22. In this case, the floating diffusion region FD2 may be two or more times larger in photocharge storage capacity than the floating diffusion region FD1 of the photocharge storage circuit 122. Thus, the floating diffusion region FD2 may be formed to have a size (capacity) capable of storing all photocharges generated by at least two unit pixels.

Since the pass transistor TR21 is turned on and the pass transistor TR22 is turned off, the photocharge storage circuit 124 may store photocharges in the floating diffusion region FD2. In this case, the photocharge storage circuit 124 may be designed in a manner that the pass transistor TR21 remains turned on and the pass transistor TR22 remains turned off until photocharges generated by two unit pixels are consecutively stored in the photocharge storage circuit 124. In addition, since the pass transistor TR21 is turned off and the pass transistor TR22 is turned on, the photocharge storage circuit 124 may output photocharges stored in the floating diffusion region FD2 to the common node CL2. The pass transistor TR21 may be turned on or off in response to the pass signal TRS21, and the pass transistor TR22 may be turned on or off in response to the pass signal TRS22.

The photocharge storage circuit 126 may include pass transistors TR31 and TR32 coupled in series to each other in an active region ACT3, and a floating diffusion region FD3 located between gates of the pass transistors TR31 and TR32 in the active region ACT3. That is, the floating diffusion region FD3 may include an impurity region (e.g., a source or drain) commonly coupled to the pass transistors TR31 and TR32. In this case, the floating diffusion region FD3 may be two or more times larger in photocharge storage capacity than the floating diffusion region FD2 of the photocharge storage circuit 124. Thus, the floating diffusion region FD3 may be formed to have a size (capacity) capable of storing all photocharges generated by at least four unit pixels.

Since the pass transistor TR31 is turned on and the pass transistor TR32 is turned off, the photocharge storage circuit 126 may store photocharges in the floating diffusion region FD3. In this case, the photocharge storage circuit 126 may be designed in a manner that the pass transistor TR31 remains turned on and the pass transistor TR32 remains turned off until photocharges generated by four unit pixels are consecutively stored in the photocharge storage circuit 126. In addition, since the pass transistor TR31 is turned off and the pass transistor TR32 is turned on, the photocharge storage circuit 126 may output photocharges stored in the floating diffusion region FD3 to the common node CL2. The pass transistor TR31 may be turned on or off in response to the pass signal TRS31, and the pass transistor TR32 may be turned on or off in response to the pass signal TRS32.

When any one of the photocharge storage circuits 122, 124, and 126 stores photocharges in the corresponding floating diffusion region FD1, FD2, or FD3, the remaining photocharge storage circuits may not operate. When the photocharge storage circuits 122, 124, and 126 output photocharges stored in the corresponding floating diffusion regions FD1, FD2, and FD3 to the common node CL2, at least one of the photocharge storage circuits 122, 124, and 126 may operate in response to the pass signals TRS12, TRS22, and TRS32. In this case, information about which one of the photocharge storage circuits will operate may be determined based on how many unit pixels will be used to output the pixel signal corresponding to the sum of such photocharges.

The pixel group PXG_G may output a single pixel signal corresponding to photocharges generated by a single unit pixel, a 2-SUM pixel signal corresponding to the sum of photocharges generated by two unit pixels, a 3-SUM pixel signal corresponding to the sum of photocharges generated by three unit pixels, a 4-SUM pixel signal corresponding to the sum of photocharges generated by four unit pixels, a 5-SUM pixel signal corresponding to the sum of photocharges generated by five unit pixels, a 6-SUM pixel signal corresponding to the sum of photocharges generated by six unit pixels, and a 7-SUM pixel signal corresponding to the sum of photocharges generated by seven unit pixels. Thus, the pixel group PXG_G may output a single pixel signal or the 2-SUM to 7-SUM pixel signals through combination of the photocharges received from the photocharge storage circuits 122, 124, and 126.

For example, the single pixel signal may be generated using photocharges received from the photocharge storage circuit 122. The 2-SUM pixel signal may be generated using photocharges received from the photocharge storage circuit 124. The 3-SUM pixel signal may be generated by the sum of photocharges received from the photocharge storage circuits 122 and 124. The 4-SUM pixel signal may be generated using photocharges received from the photocharge storage circuit 126. The 5-SUM pixel signal may be generated by the sum of photocharges received from the photocharge storage circuits 122 and 126. The 6-SUM pixel signal may be generated by the sum of photocharges received from the photocharge storage circuits 124 and 126. The 7-SUM pixel signal may be generated by the sum of photocharges received from the photocharge storage circuits 122, 124, and 126.

The source follower transistor DX, the selection transistor SX, and the reset transistor RX shown in FIGS. 6 and 7 may be substantially similar in structure and function to those of the implementations as shown in FIGS. 3 and 4 and the same descriptions will be omitted. In the implementations in FIGS. 6 and 7, since the gate of the source follower transistor DX is coupled to the photocharge storage circuits 122, 124, and 126, the pixel signal (i.e., the single pixel signal, the 2-SUM pixel signal, or the 4-SUM pixel signal) corresponding to the magnitude (amount) of photocharges received from the photocharge storage circuits 122, 124, and 126 may be generated so that the resultant pixel signal can be output to the selection transistor SX.

The transfer signals TS1 to TS16, the pass signals TRS11 to TRS32, the selection signal SX, and the reset signal RS may be provided from the row driver 200.

As is apparent from the above description, the image sensing device based on some implementations of the disclosed technology can acquire all pixel signals (e.g., a single pixel signal and a SUM pixel signal) of several modes using only one exposure.

Although a number of illustrative embodiments have been described, modifications to the disclosed embodiments and other embodiments can be devised based on what is described and/or illustrated in this patent document.

What is claimed is:

1. An image sensing device, comprising:
a pixel array configured to include a plurality of pixel groups consecutively arranged in row and column directions,
wherein
each of the pixel groups includes a plurality of unit pixels, each unit pixel configured to include a photoelectric conversion element structured to generate photocharges through a conversion of incident light,
each of the pixel groups outputs a first pixel signal corresponding to photocharges generated by a single unit pixel and a second pixel signal corresponding to a sum of photocharges generated by two or more unit pixels,
wherein each of the pixel groups includes:
a plurality of first unit pixels configured to output the first pixel signal and share a first floating diffusion region;
a plurality of second unit pixels configured to output the second pixel signal and share a second floating diffusion region;
a first pass transistor coupled to the first floating diffusion region, and configured to transmit photocharges stored in the first floating diffusion region to a common node based on a first pass signal; and
a second pass transistor coupled to the second floating diffusion region, and configured to transmit photocharges stored in the second floating diffusion region to the common node based on a second pass signal.

2. The image sensing device according to claim 1, wherein:
the first floating diffusion region has a storage capacity different from a storage capacity of the second floating diffusion region.

3. The image sensing device according to claim 1, wherein:
the first floating diffusion region is configured to store photocharges generated by any one unit pixel among the first unit pixels; and
the second floating diffusion region is configured to store photocharges generated by all of the second unit pixels.

4. The image sensing device according to claim 1, wherein each of the pixel groups further includes:
- a plurality of third unit pixels configured to share a third floating diffusion region; and
- a third pass transistor coupled to the third floating diffusion region, and configured to transmit photocharges stored in the third floating diffusion region to the common node based on a third pass signal.

5. The image sensing device according to claim 4, wherein:
- the third floating diffusion region has a storage capacity greater than a storage capacity of the second floating diffusion region.

6. The image sensing device according to claim 4, wherein:
- the third floating diffusion region is configured to simultaneously store photocharges generated by all of the third unit pixels.

7. The image sensing device according to claim 1, wherein each of the pixel groups further includes:
- a source follower transistor having a gate terminal coupled to the common node, and configured to output the first pixel signal or the second pixel signal that corresponds to a magnitude of photocharges transferred to the common node.

8. The image sensing device according to claim 7, wherein each of the pixel groups further includes:
- a selection transistor having a first terminal coupled to the source follower transistor and a second terminal coupled to an output node.

9. The image sensing device according to claim 8, wherein each of the pixel groups further includes:
- a reset transistor having a first terminal coupled to the common node and having a second terminal coupled to a pixel voltage node to which a pixel voltage is applied, the reset transistor configured to initialize the common node to the pixel voltage.

10. The image sensing device according to claim 1, wherein the plurality of unit pixels included in each of the pixel groups include color filters configured to allow light having a same color to pass therethrough.

11. The image sensing device according to claim 1, wherein the plurality of pixel groups includes a first pixel group configured to allow light having a first color to pass therethrough to be detected and a second pixel group configured to allow light having a second color different from the first color to pass therethrough to be detected.

12. The image sensing device according to claim 1, wherein each of the first floating diffusion region and the second floating diffusion region has a stacked structure including a first impurity region having a first conductivity type and a second impurity region having a second conductivity type different from the first conductivity type.

13. The image sensing device according to claim 1, wherein each of the pixel groups further includes a plurality of first transfer transistors coupled to photoelectric conversion elements of the first unit pixels and configured to transmit photocharges generated by the photoelectric conversion elements of the first unit pixels to the first floating diffusion region based on corresponding transfer signals.

14. The image sensing device according to claim 1, wherein each of the pixel group further includes a plurality of second transfer transistors coupled to photoelectric conversion elements of the second unit pixels and configured to transmit photocharges generated by the photoelectric conversion elements of the second unit pixels to the second floating diffusion region based on corresponding transfer signals.

15. The image sensing device according to claim 1, wherein the first pass transistor and the second pass transistor are turned on or off based on the first pass signal and the second pass signal, respectively, and wherein the first pass signal and the second pass signal are activated at different times from each other.

16. The image sensing device according to claim 1, further comprising:
- a row driver communicatively coupled to the pixel array and configured to generate a row selection signals to select one or more rows in the pixel array.

17. The image sensing device according to claim 1, further comprising:
- a correlated double sampler configured to receive the first pixel signal or the second pixel signal from the pixel array and perform a correlated double sampling on output voltages corresponding to the first pixel signal or the second pixel signal.

18. The image sensing device according to claim 17, further comprising:
- a converter communicatively coupled to the correlated double sampler and configured to receive an output signal from the correlated double sampler and convert the output signal to a digital signal.

* * * * *